United States Patent
Fujisaki et al.

(10) Patent No.: US 7,869,592 B2
(45) Date of Patent: Jan. 11, 2011

(54) CALCULATION APPARATUS AND ENCRYPT AND DECRYPT PROCESSING APPARATUS

(75) Inventors: Koichi Fujisaki, Kanagawa-ken (JP); Atsushi Shimbo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 176 days.

(21) Appl. No.: 12/285,077

(22) Filed: Sep. 29, 2008

(65) Prior Publication Data

US 2009/0092246 A1   Apr. 9, 2009

Related U.S. Application Data

(62) Division of application No. 10/947,208, filed on Sep. 23, 2004, now abandoned.

(30) Foreign Application Priority Data

Sep. 25, 2003   (JP) ............................... 2003-332817

(51) Int. Cl.
  *H04K 1/00*   (2006.01)
(52) U.S. Cl. .............................. 380/28; 380/30; 713/176
(58) Field of Classification Search .................. 380/28, 380/29; 708/520, 254, 135, 514
See application file for complete search history.

(56) References Cited

U.S. PATENT DOCUMENTS

| | | | |
|---|---|---|---|
| 4,823,258 A | 4/1989 | Yamazaki | |
| 5,038,312 A | 8/1991 | Kojima | |
| 5,267,185 A | 11/1993 | Akabane et al. | |
| 5,319,586 A | 6/1994 | Gupta et al. | |
| 5,422,836 A | 6/1995 | Beichter et al. | |
| 5,815,421 A | 9/1998 | Dulong et al. | |
| 5,905,666 A | 5/1999 | Hoffman et al. | |
| 6,064,738 A * | 5/2000 | Fridrich | 380/28 |
| 6,574,651 B1 | 6/2003 | Cui et al. | |
| 6,909,785 B1 * | 6/2005 | Rose | 380/260 |
| 7,003,542 B2 * | 2/2006 | Devir | 708/520 |

(Continued)

OTHER PUBLICATIONS

Satoh et al., "Effective Implementation Method of Polynomial Multiplying Circuit in AES," National Conference of Information Processing Institute No. 63, 1989.

(Continued)

*Primary Examiner*—Kimyen Vu
*Assistant Examiner*—April Y Shan
(74) *Attorney, Agent, or Firm*—Finnegan, Henderson, Farabow, Garrett & Dunner, L.L.P.

(57) ABSTRACT

A calculation apparatus capable of executing any of a first calculating process operation including a first matrix calculation, and a second calculating process operation including a second matrix calculation, includes: a first calculation unit for executing the second matrix calculation; at least one calculation unit other than the first calculation unit, for executing a matrix calculation in parallel to the first calculation unit so as to execute the first matrix calculation; and a logic circuit for performing a logic calculation with respect to a calculation result of the first calculation unit and a calculation result of the other calculation unit. Then, when a calculation result of the first matrix calculation is requested, the calculation apparatus acquires the calculation result from the logic circuit. As a result, the calculation apparatus and an encrypt/decrypt processing apparatus can commonly perform portions of the plural calculating process operations which contain the matrix calculations, and can realize high speed operation by executing portions of the matrix calculations in parallel.

4 Claims, 4 Drawing Sheets

U.S. PATENT DOCUMENTS

| | | | |
|---|---|---|---|
| 7,159,115 B2* | 1/2007 | Fujisaki et al. | 713/171 |
| 2003/0091193 A1* | 5/2003 | Bunimov et al. | 380/278 |
| 2003/0126176 A1 | 7/2003 | Devir | |
| 2003/0187898 A1 | 10/2003 | Nakanishi | |
| 2005/0129228 A1* | 6/2005 | LaGarde | 380/42 |
| 2006/0034452 A1* | 2/2006 | Tonomura et al. | 380/28 |
| 2007/0195948 A1* | 8/2007 | Bunimov et al. | 380/28 |

OTHER PUBLICATIONS

Hideo Shimizu et al., "Implementation of SPN Block Cipher," ISEC 2001-55 (Sep. 2001), pp. 17-21.

* cited by examiner

CALCULATION APPARATUS AND ENCRYPT AND DECRYPT PROCESSING APPARATUS

CROSS-REFERENCE TO RELATED APPLICATIONS

This application is a divisional of U.S. patent application Ser. No. 10/947,208, filed Sep. 23, 2004, now abandoned which is based upon and claims the benefit of priority from the prior Japanese Patent Application No. 2003-332817, filed Sep. 25, 2003, both of which are incorporated herein by reference in their entirety.

BACKGROUND

1. Field of the Invention

The present invention is related to a calculation apparatus and an encrypt and decrypt processing apparatus, for executing a plurality of arithmetic processing operations, while matrix calculating operations are employed in at least a portion of these plurality of arithmetic processing operations.

2. Description of the Related Art

The common key cryptosystem "AES (Advanced Encryption Standard)" of US standard is the common key cryptosystem which has been used in the world instead of the conventional common key cryptosystem "DES (DATA Encryption Standard)." The technical specification of AES is disclosed in "FIPS190-2."

The common key cryptosystem "AES" contains matrix calculating operations referred to as "MixColumns" and "InvMixColumns." The thesis entitled "Effective Implementation Method of Polynomial Multiplying Circuit in AES", national conference of Information Processing Institute No. 63 (post period of Heisei-era 13) discloses such a technical idea that both a partial circuit for constituting MixColumns and a partial circuit for constituting InvMixColumns can be shared. As previously explained, because the circuits are shared, the size of the circuits can be made smaller than if the circuits for constituting MixColumns and the circuits for constituting InvMixColumns are independently designed.

Generally speaking, when LSI is designed, two requirements are established, namely, circuit sizes of LSI must be reduced, and LSI must be operated in higher operating frequencies. The reductions of the circuit sizes can reduce costs of LSI, whereas the operations of LSI at the higher operating frequencies can improve performance thereof. In order to decrease circuit sizes of LSI, it can be realized by those portions for performing the same process operations are processed by a shared circuit.

On the other hand, in order to operate LSI in higher operating frequencies, maximum delay paths which may constitute a factor for determining an operating frequency must be made shorter in synchronous type LSI. A maximum delay path is called a critical path, and corresponds to such a signal line which executes the longest calculation operation in a calculating circuit within a cycle of a synchronous signal. An operating frequency of a synchronous type LSI can be increased by shortening this critical path. In order to shorten a critical path, the following circuit arrangement is required. That is, circuit portions capable of calculating in parallel are discovered, and thus, such a circuit capable of executing a parallel calculation must be arranged.

If the previously explained thesis is applied to LSI designing of AES, then a circuit size of designed LSI may be decreased. However, this thesis neither describes, nor teaches such an LSI designing idea that calculations are carried out in a parallel manner so as to realize a high speed calculation, namely, the higher operating frequency cannot be realized.

SUMMARY

According to one aspect related to the present invention, there is provided a calculation apparatus alternatively executing any of a first calculating process operation including a first matrix calculation, and a second calculating process operation including a second matrix calculation, comprising: a first calculation unit configured to execute said second matrix calculation; a second calculation unit configured to execute a third matrix calculation in parallel to said first calculation unit; and a logic circuit configured to perform a logic calculation on a calculation result of said first calculation unit and a calculation result of said second calculation unit; wherein the execution result of said first matrix calculation is obtained from said logic circuit.

According to another aspect related to the present invention, there is provided a method for alternatively executing any of a first calculating process operation including a first matrix calculation, and a second calculating process operation including a second matrix calculation, the method comprising:

executing said second matrix calculation; executing a third matrix calculation concurrently with the execution of said second matrix calculation; and performing a logic calculation on a calculation result of the execution of said second matrix calculation and a calculation result of the execution of a third matrix calculation; wherein the execution result of said first matrix calculation is obtained from said logic calculation.

BRIEF DESCRIPTION OF THE DRAWINGS

The accompanying drawings, which are incorporated in and constitute a part of this specification, illustrate several aspects of the invention and together with the description, serve to explain the principles of the invention.

DETAILED DESCRIPTION

Reference will now be made in detail to various aspects related to the present invention, examples of which are illustrated in the accompanying drawings. Wherever possible, the same reference numbers will be used throughout the drawings to refer to the same or like parts.

Assuming now that a matrix "M" is expressed by adding two, or more matrices $(M_1, M_2, \ldots, M_n (n \geq 2))$ to each other, a multiplication between the matrix "M" and an extension field "D" which is defined on a certain irreducible polynomial may be expanded as shown in formula 1:

$$M \times D = (M_1 \oplus M_2 \oplus \ldots \oplus Mn) \times D (n \geq 2)$$
$$= M_1 \times D \oplus M_2 \times D \oplus \ldots \oplus Mn \times D (n \geq 2)$$

formula 1

As previously explained, since the matrix "M" is equivalently reexpressed by adding two or more matrices as represented in the formula 1, the respective calculation formulae ($M_1$*D, $M_2$*D, . . . , $M_n$*D) on a right hand side of the above-described formula 1 can be calculated in a parallel manner. However, it should be understood that when the matrix "M" is implemented on a circuit, a circuit size is simply increased by parallel calculations.

On the other hand, in such a case that respective elements M(h, g) (h≧1, r≧1) of the subject matrix M are expressed by two or more elements are by way of an adding calculation, if the respective elements to be expressed by a plurality of values smaller than original elements, then a calculation amount may be decreased by executing a calculation based upon these values, instead of a calculation based upon the original elements. In the case that the matrix "M" is implemented by performing the calculation based upon these values, both a critical path and a circuit size can be reduced.

The reason why the critical path and the circuit size can be reduced will now be explained as follows: First, it is assumed that the irreducible polynomial is formula 2:

$$a_n{*}X^n + a_{n-1}{*}X^{n-1} + \ldots + a_2{*}X^2 + a_1{*}X + a_0{*}1 \ (n \geq 2) \ (a_n, a_{n-1} \ldots, a_2, a_1, a_0 \text{ is equal to 0 or 1})$$

formula 2

Also, a value on this irreducible polynomial is assumed as a value "S" (symbol "S" is n-bit width (n2)).

Now, generally speaking, in the case that a double multiplication for doubling the value S is carried out, after a judgment is first made as to whether the most significant bit (MSB) of the input data is equal to 0 or 1, the matrix is implemented by employing a condition statement, such as, if there is a carry or there is no carry. However, in this matrix implementation, a circuit for branching the conditions is required, thus delays in the condition judging circuit are increased.

As a consequence, when the double multiplication is carried out, the irreducible polynomial may be modified as expressed in the formula (3) below so as to calculate a modified irreducible polynomial:

$$F_2(S) = 2{*}S = (S<<1) \oplus (n\{S(n)\} \& \{a_n, a_{n-1} \ldots, a_2, a_1, a_0\})$$

formula 3

In this formula 3, symbol "S<<1" implies that the input value "S" has been shifted bit-by-bit along the left direction, and symbol "n{S(n)}" implies that "n" pieces of the most significant bits of the input value "S" are arranged. Also, symbol "&" indicates a logical product, and symbols ($a_n, a_{n-1}, \ldots, a_2, a_1, a_0$) shows that the coefficients of the above-explained irreducible polynomial are arranged.

When the matrix is implemented as indicated by the formula 3, since the judgment for branching the conditions is no longer required, the circuit can be operated at a high speed. Moreover, the condition judging circuit can be reduced. As a result, the circuit size can be made smaller.

Also, in such a case that a triple multiplication for multiplying the value "S" by 3 is carried out, the irreducible polynomial may be expressed by the following formula 4:

$$F_3(S) = 3{*}S = 2{*}S \oplus S = F_2(S) \oplus S$$

formula 4

Similarly, in the case that a quadruple multiplication is carried out, "$F_2(F_2(S))$" is calculated. In the case that a quintuple multiplication is carried out, $F_5(S)=F_4(S)\hat{}S$ is calculated.

As apparent from the foregoing explanations, as the number to be multiplied becomes larger, the calculation amount becomes larger. Further, the circuit sizes of the calculating circuits for executing these calculating operations are similarly increased. Conversely speaking, as the number to be multiplied becomes smaller, the calculation amount becomes smaller. Further, the circuit sizes of the calculating circuits for executing these calculating operations are similarly decreased.

As apparent from the above explanations, since the matrix is subdivided into a plurality of subdivided matrices which are constituted by the elements with employment of the smaller numerals than the elements of the original matrix, and then, these subdivided matrices are expressed by the addition, while the calculations can be carried out in the parallel manner, each of the matrix calculations can be carried out by calculating the smaller numerals than those of the calculation of the original matrix. In other words, the calculation amount is decreased, and the calculation time is shortened. As a result, also in the entire calculation, while the increase of the circuit size caused by the parallel calculations can be suppressed, the critical path can be reduced. As a consequence, when the original matrix is subdivided, it is important to subdivide the original matrix into a plurality of subdivided matrices, the numbers of which are smaller than the numbers of the elements of the original matrix.

Figure 1:
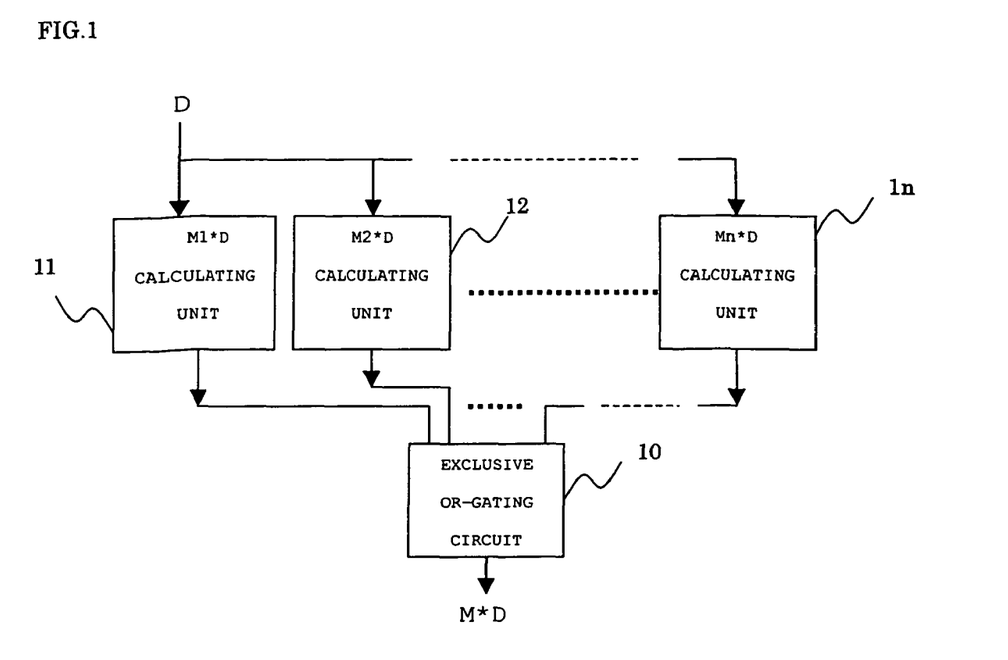
FIG. 1 is a diagram for schematically showing function blocks of an encrypt/decrypt processing apparatus according to an embodiment of the present invention, namely a diagram for representing a basic process operation of AES.

FIG. 1 schematically shows function blocks of an encrypt/decrypt processing apparatus according to this embodiment mode. This encrypt/decrypt processing apparatus is employed so as to multiply a predetermined matrix "M" by an extension field "D" which is defined on a certain irreducible polynomial which is given as an input. It should be understood that respective elements of matrices "$M_1$" to "$M_n$" in a matrix $M=(M_1\hat{}M_2\hat{}, \ldots, \hat{}M_n)$ ($\hat{}$ is exclusive OR-gate) are smaller numbers than those of respective corresponding elements of this original matrix "M."

An $M_1$*D calculating unit 11 is previously equipped with a matrix $M_1$, and multiplies the matrix $M_1$ by an entered extension field D, and then, outputs a calculation result. An $M_2$*D calculating unit 12 is previously equipped with a matrix $M_2$, and multiplies the matrix $M_2$ by the entered extension field D, and then, outputs a calculation result. Succeeding to the above-described calculating units, an $M_n$*D calculating unit 1n (n≧2) is previously equipped with a matrix $M_n$, and multiplies the matrix $M_n$ by the entered extension field D, and then, outputs a calculation result. An exclusive OR-gating circuit 10 exclusive OR-gates the calculation results outputted from these calculating units 11, 12, . . . , 1n, so that a calculation result of M*D is outputted.

As previously explained, the calculating units 11 to in are equipped with the matrices M1 to Mn obtained by subdividing the original matrix M into two or more subdivided matrices, and mutually execute the calculating operations in an independent manner with respect to the extension field D entered to these calculating units 11 to 1n. As a result, the calculations of the matrix M can be carried out in the parallel manner. Moreover, since the respective elements of the matrices $M_1$ to $M_n$ are smaller numbers than those of the respective corresponding elements of the original matrix M, the critical path can be reduced by the calculation of M*D, and the increase in the circuit size caused by the parallel processing operations can also be reduced.

In addition, if one column of the subdivided matrix Mi is as same as at least another column, then the calculations of these columns can also be utilized in another calculation since any of these calculations is carried out one time. In other words, since these calculating circuits for this portion can be shared, the circuit size can be reduced.

Figure 2:
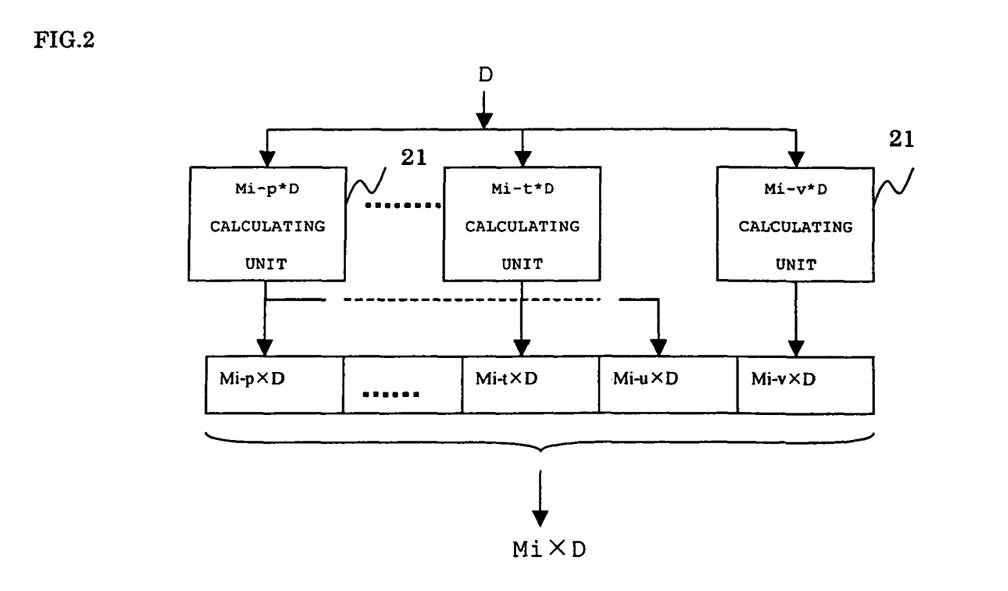
FIG. 2 is a diagram for schematically indicating function blocks contained in an Mi*D calculating unit 11.

FIG. 2 is a diagram for schematically showing function blocks contained in an Mi*D calculating unit 1*i* in such a case that among a p-th column through a v-th column which correspond to the respective columns of one matrix Mi of the subdivided matrices, all of respective elements for both the p-th column and the u-th column are common to each other.

An Mi-p*D calculating unit 21 is previously equipped with a column Mi-p, multiplies the column Mi-p by the extension field D, and then outputs a calculation result to the relevant portion of a register 20. Succeeding to the Mi-p*D calculating unit 21, an Mi-t*D calculating unit 21 is previously equipped with a column Mi-t, multiplies the column Mi-t by the extension field D, and then outputs a calculation result to the relevant portion of a register 20. An Mi-v*D calculating unit 21 is previously equipped with a column Mi-v, multiplies the column Mi-v by the extension field D, and then outputs a calculation result to the relevant portion of the register 20. In this case, as to the calculations as to both the p column and the u column, in which the respective elements within the matrix Mi ($i \geq 2$) are equal to each other, if any one of these columns is calculated only one time, then the calculation result may also be used as the calculation result with respect to such a column that other respective elements are equal thereto. As a result, FIG. 2 shows such a circuit block that the calculation result of the Mi-p*D calculating unit 21 is supplied to both an area of the register 20 for storing the calculation result of Mi-p*D and another area thereof for storing the calculation result of Mi-u*D. As a consequence, the Mi*D calculating unit 11 is not equipped with an Mi-u*D calculating unit.

As previously explained, if the matrix M can be subdivided in such a manner that calculations as to a plurality of columns are carried out by a calculating circuit of a single column, then a circuit size can be reduced by commonly using this single calculating circuit.

In accordance with the above-described encrypt and decrypt processing apparatus of this embodiment mode, the encrypt and decrypt processing apparatus is arranged in a manner that the matrix to be calculated is subdivided into the plurality of matrices which are constituted by the smaller matrix elements than the elements of the original matrix, and the plurality of calculating circuits for calculating the respective subdivided matrices are provided in the parallel manner in correspondence with these subdivisions. As a result, the critical path can be reduced and the high speed calculation can be carried out. Also, in such a matrix that has multiple columns having the same elements in the subdivided matrices, only one shared calculating unit may be provided with respect to the calculations of these columns, so that the circuit with reduced circuit size may be provided. A specific attention should be paid to the following features. That is, such a feature that the original matrix can be subdivided into the plural subdivided matrices which are constituted by the smaller matrix elements than those of the original matrix is provided with all of the matrices. However, on the other hand, such a feature that there are plural columns having the same elements in the subdivided matrix is not provided with all of these matrices.

Figure 3:
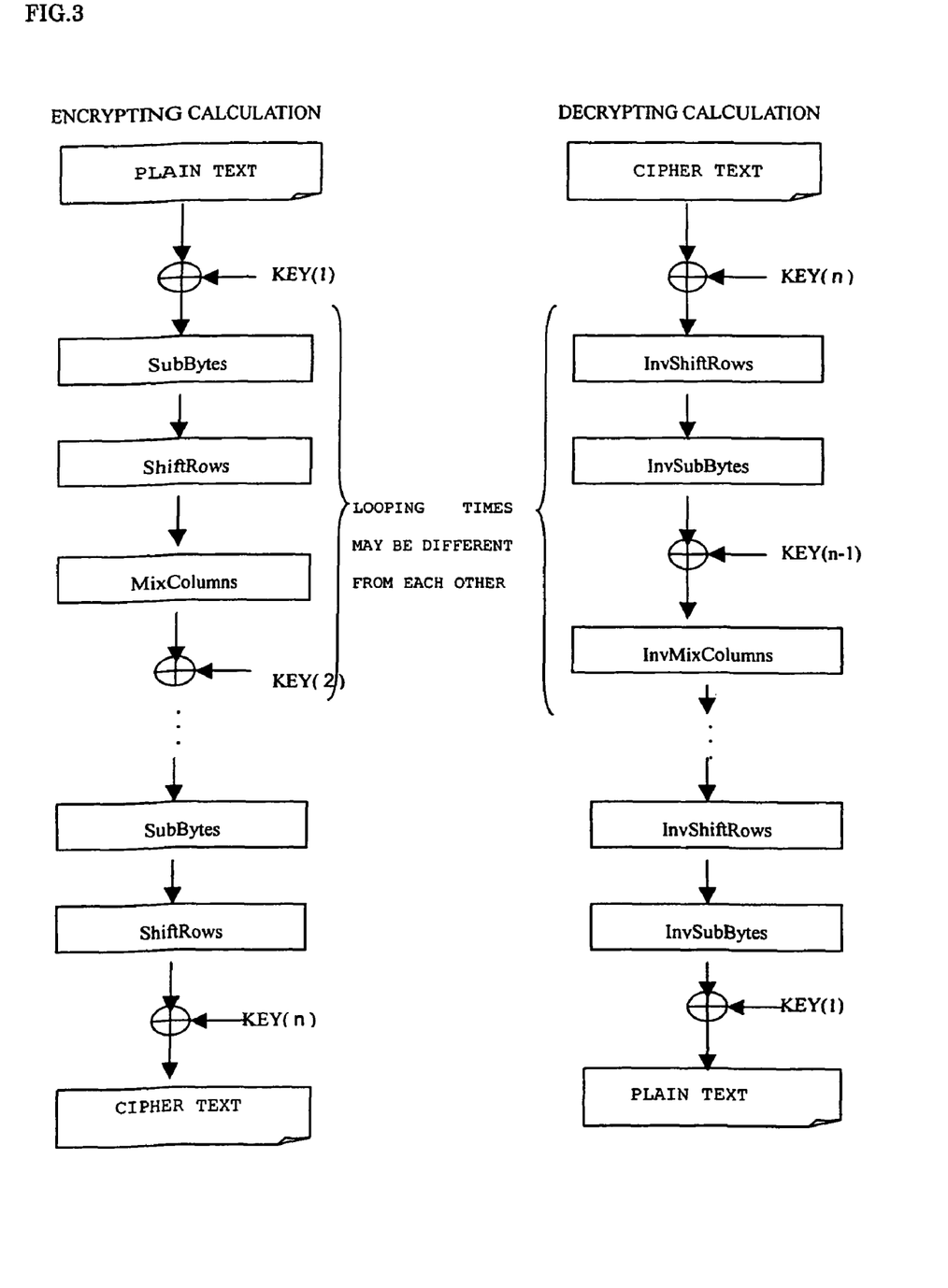
FIG. 3 represents sequential operations as to AES cryptograph type encrypt processing operation and decrypt processing operation.

Next, this embodiment will now be indicated in detail, using the AES cryptosystem is one concrete example. FIG. 3 indicates an AES cryptosystem type encrypt calculation and an AES cryptosystem type decrypt calculation.

In the encrypt calculation, a plain text is inputted; the entered plain text is exclusive OR-gated with a key; and thereafter, a series of such process operations as SubBytes, ShiftRows, MixColumns, and exclusive OR-gating with a key are repeatedly carried out predetermined times (n−2 times); and finally, a series of such process operations as SubBytes, ShiftRows, and Exclusive OR-gating with a key are carried out to output a calculation result as a cipher text. It should be noted that symbol "n" becomes different from each other, depending upon key lengths.

On the other hand, in the decrypt calculation, a cipher text is inputted; the entered cipher text is exclusive OR-gated with a key; and thereafter, a series of such process operations as InvShiftRows, InvSubBytes, exclusive OR-gating with a key, and InvMixColumns are repeatedly carried out predetermined times (n−2 times); and finally, a series of such process operations as InvShiftRows, InvSubBytes, and exclusive OR-gating with a key are carried out to output a calculation result as a plain text. It should also be noted that another input of the exclusive OR-gating operation corresponds to such a key "i ($1 \leq i \leq n$)" which is produced from a key producing means based upon a predetermined algorithm, and further, key producing sequences in the encrypt calculation and the decrypt calculation are inverse to each other.

In the process operation of SubBytes, inverse numbers of input values on $GF(2^8)$ are represented as $b_0, b_1, b_2, b_3, b_4, b_5, b_6, b_7$ with respect to an 8-bit input, and furthermore, a calculation (affine transformation) of formula 5 is performed:

$$b'_i = b_{(i+4) \bmod 8} \oplus b_{(i+5) \bmod 8} \oplus b_{(i+6) \bmod 8} \oplus b_{(i+7) \bmod 8} \oplus C_i \qquad \text{formula 5}$$

Since this calculation for obtaining the inverse numbers is complex, the conversion table has been described in the specification of the AES cryptosystem in order that the inverse numbers are calculated and the values after the affine transformation has been carried out can be simply obtained in the process operation of SubBytes. On the other hand, in the process operation of InvSubBytes, the calculation is carried out in the sequence opposite to that of the process operation of SubBytes. In other words, after the affine transformation has been performed, a calculation capable of obtaining an inverse number of this transferred value is carried out.

"shiftRows" indicates a process operation for performing a calculation by which data are rearranged based upon a predetermined method. On the other hand, symbol "InvShiftRows" shows a process operation for performing a calculation by which data are rearranged in the order opposite to that of ShiftRows.

In the process operation of MixColumns, a matrix calculation defined in formula 6 (below) is carried out with respect to 32-bit input data (S1, S2, S3). In the process operation of InvMixColumns, a matrix calculation defined in formula 7 (below) is carried out with respect to the 32-bit input data (S1, S2, S3). It should also be understood that more detailed process operations of the AES cryptosystem are described in the specification of the AES cryptosystem.

In the process operation of MixColumns, the matrix calculation of formula 6 is carried out, whereas in the process operation of InvMixColumns, the matrix calculation of formula 7 is carried out, which are defined in the calculation algorithm of the AES cryptosystem:

$$\begin{pmatrix} S'1 \\ S'2 \\ S'3 \\ S'4 \end{pmatrix} = \begin{pmatrix} 2 & 3 & 1 & 1 \\ 1 & 2 & 3 & 1 \\ 1 & 1 & 2 & 3 \\ 3 & 1 & 1 & 2 \end{pmatrix} \begin{pmatrix} S1 \\ S2 \\ S3 \\ S4 \end{pmatrix} \quad \text{MixColumns} \qquad \text{formula 6}$$

$$\begin{pmatrix} S'1 \\ S'2 \\ S'3 \\ S'4 \end{pmatrix} = \begin{pmatrix} e & b & d & 9 \\ 9 & e & b & d \\ d & 9 & e & b \\ b & d & 9 & e \end{pmatrix} \begin{pmatrix} S1 \\ S2 \\ S3 \\ S4 \end{pmatrix} \quad \text{InvMixColumns.} \qquad \text{formula 7}$$

In the formulae, input S=(S1, S2, S3, S4), and output S'=(S'1, S'2, S'3, S'4). Note that S1, S2, S3, S4 are extension fields on 8-bit $GF(2^8)$.

In this case, a subdivision of the matrix calculation is carried out which is used in the process operation of InvMixColumns. If the matrix calculation used in the process operation of InvMixColumns is separated into the matrix used in the process operation of MixColumns and a matrix other than this matrix and is subdivided in such a manner that the separated matrices become equivalent to each other by employing an adding calculation, then the resultant matrix is expressed by the following formula 8:

$$\begin{pmatrix} e & b & d & 9 \\ 9 & e & b & d \\ d & 9 & e & b \\ b & d & 9 & e \end{pmatrix} \begin{pmatrix} S1 \\ S2 \\ S3 \\ S4 \end{pmatrix} = \left\{ \begin{pmatrix} 2 & 3 & 1 & 1 \\ 1 & 2 & 3 & 1 \\ 1 & 1 & 2 & 3 \\ 3 & 1 & 1 & 2 \end{pmatrix} \oplus \begin{pmatrix} c & 8 & c & 8 \\ 8 & c & 8 & c \\ c & 8 & c & 8 \\ 8 & c & 8 & c \end{pmatrix} \right\} \begin{pmatrix} S1 \\ S2 \\ S3 \\ S4 \end{pmatrix}$$

$$= \begin{pmatrix} 2 & 3 & 1 & 1 \\ 1 & 2 & 3 & 1 \\ 1 & 1 & 2 & 3 \\ 3 & 1 & 1 & 2 \end{pmatrix} \begin{pmatrix} S1 \\ S2 \\ S3 \\ S4 \end{pmatrix} \oplus \begin{pmatrix} c & 8 & c & 8 \\ 8 & c & 8 & c \\ c & 8 & c & 8 \\ 8 & c & 8 & c \end{pmatrix} \begin{pmatrix} S1 \\ S2 \\ S3 \\ S4 \end{pmatrix}$$

formula 8

Then, a calculation as to a first term of the above-described formula 8 and the calculation as to the process operation of MixColumns can be shared.

In a common encrypt calculation, it is desirable that a matrix calculation employed in a decrypt calculation can be subdivided into two calculations, namely, a matrix used in an encrypt calculation and another calculation other than this encrypt calculation. Alternatively, other subdivisions than the above-explained matrix subdivision may be employed.

Furthermore, in a matrix of a second term, elements (c 8 c 8) are equal to each other between a first column and a third column, and also elements (8 c 8 c) are equal to each other between a second column and a fourth column. As a result, only such a circuit for performing the calculation of the first column and the calculation of the second column is implemented, so that the circuit for executing the matrix calculation can be implemented.

Figure 4:
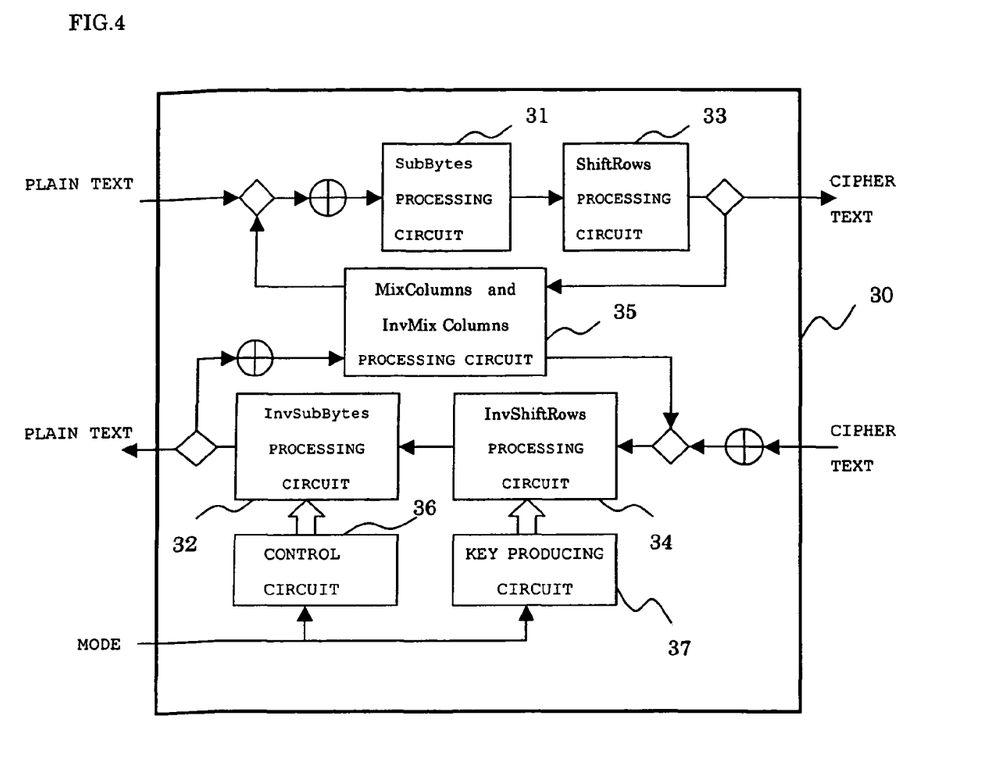
FIG. 4 is a diagram for schematically indicating function blocks of an AES encrypt/decrypt processing apparatus in the case that processing circuits for calculating MixColumns and InvMixColumns are shared.

FIG. 4 shows a functional block diagram of an AES encrypt and decrypt processing apparatus in which a calculation as to MixColumns and a calculation as to InvMixColumns are shared.

A SubBytes processing circuit 31, an InvSubBytes processing circuit 32, a ShiftRows processing circuit 33, and an InvShiftRows processing circuit 34 correspond to circuits for executing the above-explained SubBytes calculation, InvSubBytes calculation, ShiftRows calculation, and InvShiftRows calculation, respectively. Also, keys are inputted to exclusive OR gates which are located at three points in this functional block diagram. However, input lines for these keys are omitted. As to these keys to be entered, proper keys are supplied from a key producing circuit 37 to proper exclusive OR gates at proper timing. Symbol "◇" shows a switching circuit which switches operations as to whether or not any input from two inputs is accepted, or whether or not an output is supplied to any one of two outputs. This switching operation is carried out under control of a control circuit 36. However, signal lines for supplying switching instructions are omitted in this drawing. The control circuit 36 supplies a switching instruction signal to a proper switching circuit at a proper time. The control circuit 36 and the key producing circuit 37 accept a mode signal from an external source. This mode signal indicates that the AES encrypt and decrypt processing apparatus performs the encrypt operation, or the decrypt operation.

A MixColumns/InvMixColumns processing circuit 35 is controlled by the control circuit 36 in such a manner that this MixColumns/InvMixColumns processing circuit 35 executes any one of the MixColumns calculation and the InvMixColumns calculation. It should also be noted that instead of the control operation by the control circuit 36, the above-described mode signal may be directly entered from the external source to the MixColumns/InvMixColumns processing circuit 35 so as to switch these calculations.

Figure 5:
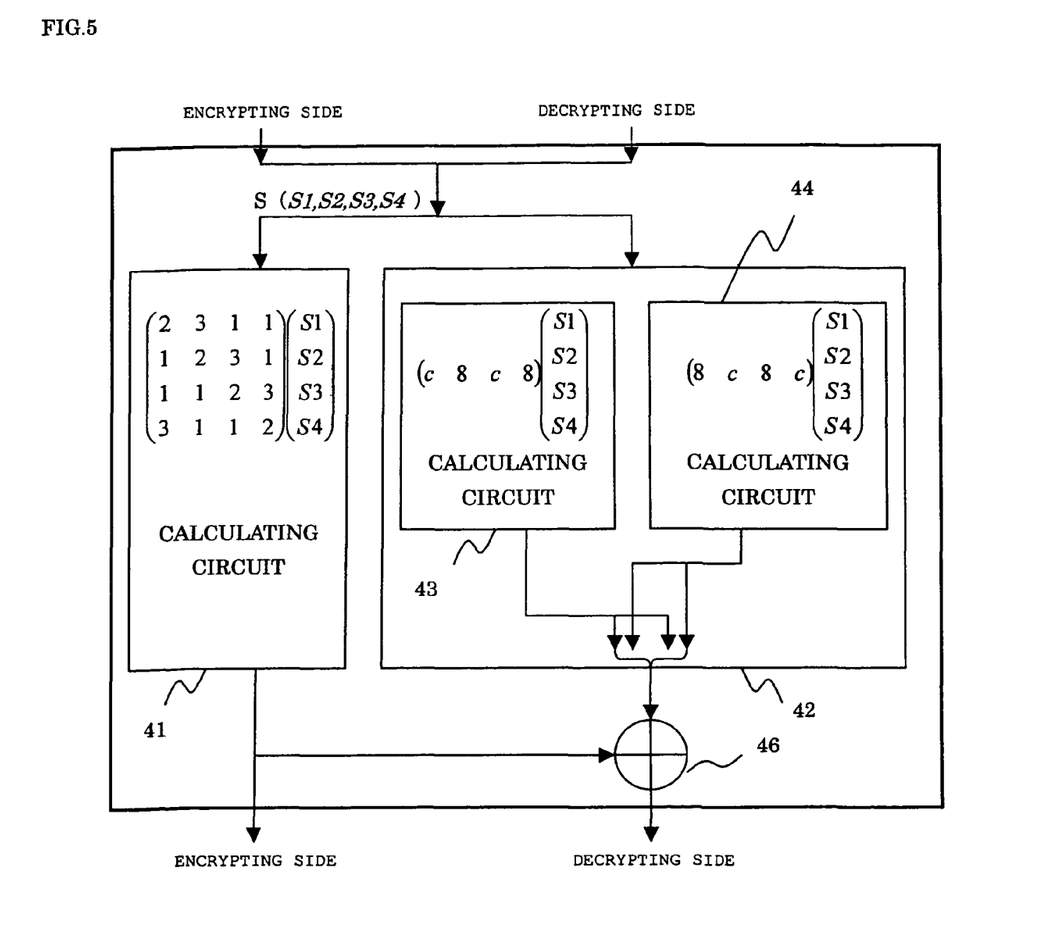
FIG. 5 is a diagram for schematically indicating an internal arrangement of a MixColumns-InvMixColumns processing circuit 35.

FIG. 5 illustrates an internal arrangement of the MixColumns/InvMixColumns processing circuit 35. In this drawing, reference numeral 41 indicates a circuit for performing a matrix calculation in MixColumns indicated by the formula 8, and reference numeral 42 represents a circuit for executing a calculation of a subdivided matrix. These circuits 41 and 42 are operated in a parallel mode. When an encrypt operation is carried out, the output from the circuit 41 is employed in the encrypt operation, whereas when a decrypt operation is carried out, both an output from the circuit 41 and an output from the circuit 42 are exclusive OR-gated by an exclusive OR gate 46, and then, the exclusive OR-gated value is employed in this decrypt calculation. The circuit 42 is further equipped with a circuit 43 for calculating (c 8 c 8) and another circuit 44 for calculating (8 c 8 c) as the calculating circuits. The output of the calculation circuit 43 is supplied to both a first column and a third column, whereas the output of the calculation circuit 44 is supplied to both a second column and a fourth column of a register 45. As a consequence, a circuit size of the calculation circuit 42 is reduced.

In accordance with the concrete example of this embodiment e which has been explained in detail, since the matrix of InvMixColumns in the calculation of AES is subdivided into the above-described two matrices with employment of MixColumns, the circuit size required for executing the calculation of InvMixColumns and the calculation of MixColumns can be reduced.

Furthermore, since the matrix is subdivided, both the first term and the second term of the above-described formula 5 can be independently calculated. As previously explained, the calculations executed in the parallel manner are such a matrix calculation whose calculation amount is small, as compared with such a case that the calculation circuits for solely calculating InvMixColumns are arranged. As a result, the delay time can become short, and the circuit can be operated at high speed (namely, synchronous signal is produced at high frequency).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An encrypt/decrypt processing apparatus capable of executing any of a decrypt processing operation that contains a first matrix calculation and an encrypt processing operation that contains a second matrix calculation, comprising:
   a first calculation unit for performing said second matrix calculation within a third matrix calculation, wherein said second matrix calculation by which the same calculation result as that of said first matrix calculation is obtained by exclusive OR-gating the first matrix calculation result and the second matrix calculation result;
   a second calculation unit for performing said third matrix calculation; and
   a logic circuit for performing a logic calculation on a calculation result of said first calculation unit and a calculation result of said second calculation unit,
   wherein:
      the calculation result of said first matrix calculation is obtained from said logic circuit;
      said third matrix calculation is provided with a plurality of columns having the same values as each other;
      said second calculation unit includes a third calculation unit for performing a matrix calculation on said plurality of columns;
      the matrix of said second matrix calculation corresponds to $$\begin{pmatrix} 2 & 3 & 1 & 1 \\ 1 & 2 & 3 & 1 \\ 1 & 1 & 2 & 3 \\ 3 & 1 & 1 & 1 \end{pmatrix};$$

the matrix of said matrix calculation as to said columns correspond to (c 8 c 8) and (8 c 8 c);
   the first calculation unit executes the encrypt processing operation based on the second matrix calculation result to output an encrypted result; and
   the first calculation unit and the third calculation unit execute the decrypt processing operation based on the second matrix calculation result and the first matrix calculation result to output a decrypted result.

2. An encrypt/decrypt processing apparatus capable of executing any of a decrypt processing operation that contains a first matrix calculation and an encrypt processing operation that contains a second matrix calculation, comprising:
   a first calculation unit for performing said second matrix calculation within a third matrix calculation, wherein said second matrix calculation by which the same calculation result as that of said first matrix calculation is obtained by exclusive OR-gating the first matrix calculation result and the second matrix calculation result;
   a second calculation unit for performing said third matrix calculation;
   a logic circuit for performing a logic calculation on a calculation result of said first calculation unit and a calculation result of said second calculation unit; and
   output means for selectively outputting the calculation result of said first calculation unit when the encrypt processing operation is carried out, and the output from the logic circuit when the decrypt processing operation is carried out,
   wherein:
      the calculation result of said first matrix calculation is obtained from said logic circuit;
      said third matrix calculation is provided with a plurality of columns having the same values as each other;
      said second calculation unit includes a third calculation unit for performing a matrix calculation on said plurality of columns;
   the matrix of said second matrix calculation corresponds to $$\begin{pmatrix} 2 & 3 & 1 & 1 \\ 1 & 2 & 3 & 1 \\ 1 & 1 & 2 & 3 \\ 3 & 1 & 1 & 1 \end{pmatrix};$$

the matrix of said matrix calculation as to said columns correspond to (c 8 c 8) and (8 c 8 c);
      the first calculation unit executes the encrypt processing operation based on the second matrix calculation result to output an encrypted result; and
      the first calculation unit and the third calculation unit execute the decrypt processing operation based on the second matrix calculation result and the first matrix calculation result to output a decrypted result.

3. An encrypt/decrypt processing method capable of executing any of a decrypt processing operation that contains a first matrix calculation and an encrypt processing operation that contains a second matrix calculation, the method comprising:
   performing, by a circuit of an LSI, said second matrix calculation within a third matrix calculation, wherein said second matrix calculation by which the same calculation result as that of said first matrix calculation is obtained by exclusive OR-gating the first matrix calculation result and the second matrix calculation result;
   performing said third matrix calculation; and
   performing a logic calculation on a calculation result of the performance of said second matrix calculation and a calculation result of the performance of said third matrix calculation,
   wherein:
      the calculation result of said first matrix calculation is obtained from the logic calculation result of the performance of said logical calculation;
      said third matrix calculation is provided with a plurality of columns having the same values as each other;
      the performance of said third matrix calculation includes performing a matrix calculation on said plurality of columns;
      the matrix of said second matrix calculation corresponds to $$\begin{pmatrix} 2 & 3 & 1 & 1 \\ 1 & 2 & 3 & 1 \\ 1 & 1 & 2 & 3 \\ 3 & 1 & 1 & 1 \end{pmatrix};$$

the matrix of said matrix calculation as to said columns correspond to (c 8 c 8) and (8 c 8 c);

the encrypt processing operation is executed based on the second matrix calculation result by the first calculation unit to output an encrypted result; and the decrypt processing operation is executed based on (i) the second matrix calculation result by the first calculation unit and (ii) the first matrix calculation result by the third calculation unit, to output a decrypted result.

4. An encrypt/decrypt processing method capable of executing any of a decrypt processing operation that contains a first matrix calculation and an encrypt processing operation that contains a second matrix calculation, the method comprising:

performing, by a circuit of an LSI, said second matrix calculation within a third matrix calculation, wherein said second matrix calculation by which the same calculation result as that of said first matrix calculation is obtained by exclusive OR-gating the first matrix calculation result and the second matrix calculation result;

performing said third matrix calculation;

performing a logic calculation on a calculation result of the performance of said second matrix calculation and a calculation result of the performance of said third matrix calculation; and selectively outputting the calculation result of the performance of said second matrix calculation when the encrypt processing operation is carried out, and the output from the performance of said logic calculation when the decrypt processing operation is carried out, wherein:

the calculation result of said first matrix calculation is obtained from the logic calculation result of the performance of said logical calculation;

said third matrix calculation is provided with a plurality of columns having the same values as each other;

the performance of said third matrix calculation includes performing a matrix calculation on said plurality of columns;

the matrix of said second matrix calculation corresponds to $$\begin{pmatrix} 2 & 3 & 1 & 1 \\ 1 & 2 & 3 & 1 \\ 1 & 1 & 2 & 3 \\ 3 & 1 & 1 & 1 \end{pmatrix};$$

the matrix of said matrix calculation as to said columns correspond to (c 8 c 8) and (8 c 8 c);

the encrypt processing operation is executed based on the second matrix calculation result by the first calculation unit to output an encrypted result; and the decrypt processing operation is executed based on (i) the second matrix calculation result by the first calculation unit and (ii) the first matrix calculation result by the third calculation unit, to output a decrypted result.

* * * * *